(12) United States Patent
Campbell

(10) Patent No.: US 8,328,135 B2
(45) Date of Patent: Dec. 11, 2012

(54) BREATHER APPARATUS ON ELECTROMECHANICAL ACTUATORS FOR AIRCRAFT LANDING GEAR SYSTEMS

(75) Inventor: Douglas Jerome Campbell, Martinsville, NJ (US)

(73) Assignee: General Electric Company, Schenectady, NY (US)

( * ) Notice: Subject to any disclaimer, the term of this patent is extended or adjusted under 35 U.S.C. 154(b) by 596 days.

(21) Appl. No.: 12/240,536

(22) Filed: Sep. 29, 2008

(65) Prior Publication Data

US 2010/0077744 A1    Apr. 1, 2010

(51) Int. Cl.
*B64C 25/10* (2006.01)
(52) U.S. Cl. .................. 244/102 A; 244/102 R
(58) Field of Classification Search .............. 244/100 R, 244/102 R, 102 A; 29/428; 74/606 R, 17.8
See application file for complete search history.

(56) References Cited

U.S. PATENT DOCUMENTS

| 22,890 | A | * | 2/1859 | Manney ...................... 15/41.1 |
| 1,939,845 | A | * | 12/1933 | Farmer ............................ 92/78 |
| 2,202,207 | A | * | 5/1940 | Johnson ................... 200/302.2 |
| 2,830,671 | A | * | 4/1958 | Robbins ........................ 96/112 |
| 2,837,926 | A | * | 6/1958 | Korsgren, Sr. et al. ........ 74/17.8 |
| 4,557,177 | A |   | 12/1985 | Cheney |
| 5,349,894 | A |   | 9/1994 | Greer |
| 6,058,969 | A | * | 5/2000 | Bollwahn et al. ............. 137/583 |
| 6,395,073 | B1 | * | 5/2002 | Dauber .......................... 96/134 |
| 6,515,827 | B1 | * | 2/2003 | Raymond et al. ............ 360/132 |
| 6,557,240 | B1 | * | 5/2003 | Voights ..................... 29/603.03 |
| 7,098,619 | B2 |   | 8/2006 | Stridsberg |
| 7,525,404 | B2 | * | 4/2009 | Larimore et al. ............. 335/278 |
| 2008/0141803 | A1 | * | 6/2008 | Christensen et al. .......... 74/89.4 |

\* cited by examiner

*Primary Examiner* — Christopher P Ellis
(74) *Attorney, Agent, or Firm* — David J. Clement, Esq.; Armstrong Teasdale LLP

(57) ABSTRACT

An actuator system and a method for assembling the same are provided. An actuator system includes a housing and a cap. The housing includes a cavity defined by the housing and an opening defined in a wall of the housing. The housing encases an actuator within the cavity. The cap is coupled to the housing to facilitate shielding the opening from a surrounding environment.

20 Claims, 4 Drawing Sheets

BREATHER APPARATUS ON ELECTROMECHANICAL ACTUATORS FOR AIRCRAFT LANDING GEAR SYSTEMS

BACKGROUND OF THE INVENTION

The embodiments described herein relate generally to aircraft landing gear systems and, more particularly, to electromechanical actuator systems used within aircraft landing gear systems.

At least some known electromechanical actuator systems include a housing that experiences varying pressures and temperatures during a typical flight cycle of an aircraft. For example, during the aircraft ascent, the internal pressure and temperature within the housing decreases as the external pressure and temperature of the surrounding environment decrease until the aircraft is at cruising altitude. Conversely, during the aircraft descent, the internal pressure and temperature within the housing generally increases as the external pressure and temperature of the surrounding environment increases.

At least some known electromechanical actuator systems balance the internal pressure and temperature within the housing with the external pressure and temperature of the surrounding environment by including an opening in the housing that facilitates venting of air into, and out of, the housing. For example, during aircraft ascent, the opening discharges air from the housing through the opening as the external pressure and temperature of the surrounding environment decreases. At cruising altitudes, the internal pressure and temperature within the housing are typically low enough that any liquid water within the housing may become frozen. During aircraft descent, air enters the housing through the opening as the external pressure and temperature of the surrounding environment increases. More specifically, when the landing gear bay doors open during landing, the warm, moist air may condense on an actuator mechanism encased within the housing when the actuator mechanism is still cold from the flight. Some condensation may be drawn into the actuator mechanism, and over time, such condensation may cause corrosion, hydrolysis, short circuits, and/or increase an overall mass of the actuator mechanism to the point wherein the actuator mechanism is inoperable.

To address the condensation problem, at least some known electromechanical actuator systems hermetically seal the actuator mechanism within the housing and use desiccants to facilitate reducing an amount of condensation that can accumulate over an extended period of time. However, sealing the actuator mechanisms within the housing causes a substantial pressure difference to be created between the internal pressure within the housing and the external pressure of the surrounding environment. The increased pressure difference may induce additional strain on the seals of the housing, which may cause premature failure of the seals over time.

BRIEF SUMMARY OF THE INVENTION

In one embodiment, a method for assembling an actuator system is provided. The method includes positioning a housing to encase an actuator within a cavity defined by the housing, and coupling a cap to the housing to facilitate shielding an opening defined in a wall of the housing from a surrounding environment.

In another embodiment, an actuator system is provided. The actuator system includes a housing and a cap. The housing includes a cavity defined by the housing and an opening defined in a wall of the housing. The housing encases an actuator within the cavity. The cap is coupled to the housing to facilitate shielding the opening from a surrounding environment.

DETAILED DESCRIPTION OF THE INVENTION

An electromechanical actuator system (EMA) includes a housing that maintains its aridity during a course of repeated flight cycles while reducing pressure differences that may be created between an internal pressure within the housing and an external pressure of the surrounding environment is desired. As described herein, maintaining the aridity of the housing facilitates increasing reliability of the actuator mechanism (actuator) encased within the housing, and reducing pressure differences facilitates reducing sealing requirements of the housing and increasing a useful seal life.

Figure 1:
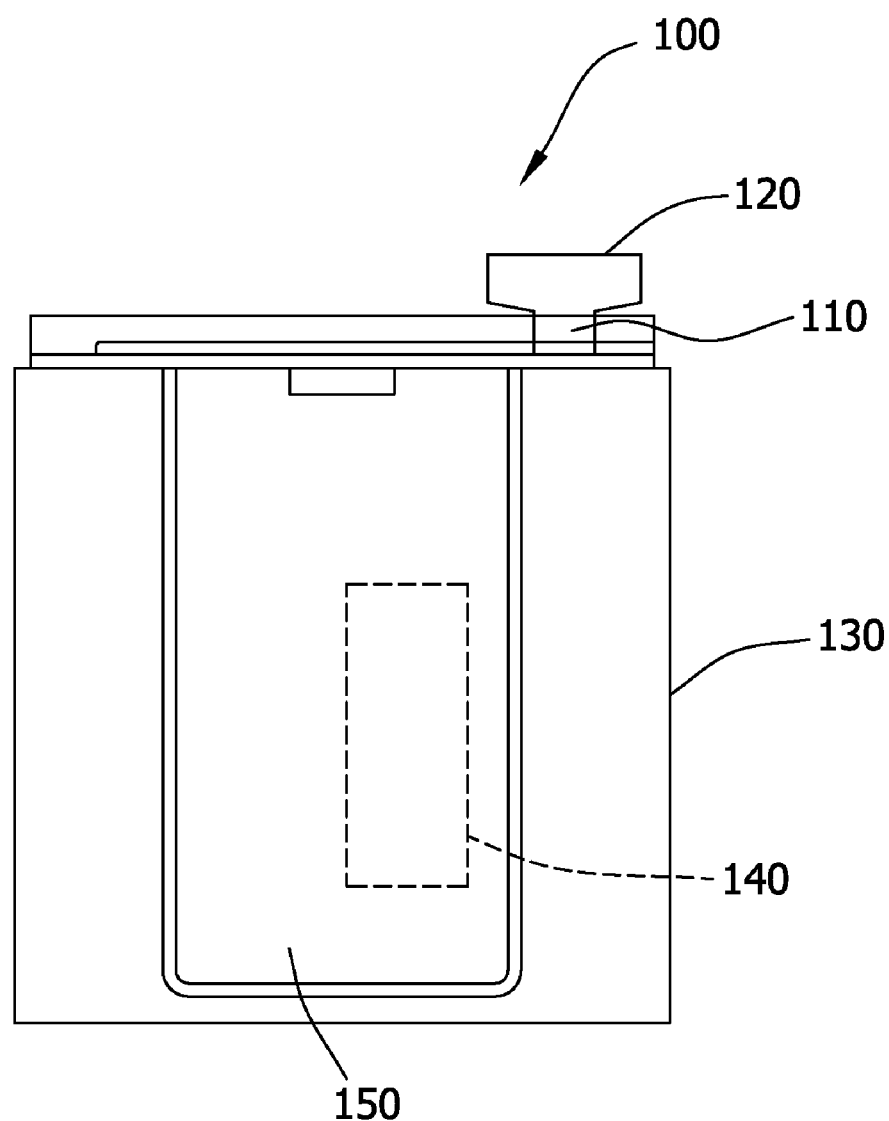
FIG. 1 is a cross-sectional schematic illustration of an exemplary electromechanical actuator system that may be used on an aircraft.

FIG. 1 is a cross-sectional schematic illustration of an exemplary electromechanical actuator system, or EMA, 100 that may be used in an aircraft (not shown). In the exemplary embodiment, EMA 100 includes a moisture pump 110, a protective cap 120, a housing 130, an actuator 140, and a cavity 150. Housing 130 includes a moisture pump 110, which is an opening oriented from an internal surface to an external surface of housing 130. Protective cap 120 is coupled to housing 130 such that it substantially covers moisture pump 110. Actuator 140 is positioned within cavity 150 defined by the internal surface of housing 130.

During a typical flight cycle of the aircraft, housing 130 experiences varying internal pressures and temperatures. For example, during the aircraft ascent, the internal pressure and temperature within housing 130 decreases as the external pressure and temperature of the surrounding environment decrease until the aircraft is at cruising altitude. Conversely, during the aircraft descent, the internal pressure and temperature within housing 130 generally increases as the external pressure and temperature of the surrounding environment increases.

To balance the internal pressure and temperature within housing 130 with the external pressure and temperature of the surrounding environment, moisture pump 110 facilitates venting of air into, and out of, housing 130. For example, during aircraft ascent, moisture pump 110 discharges air from housing 130 through moisture pump 110 as the external pressure and temperature of the surrounding environment decreases. During aircraft descent, air enters housing 130 through moisture pump 110 as the external pressure and temperature of the surrounding environment increases.

To protect actuator 140 from water, moisture, and/or condensation, protective cap 120 provides interfacial sealing that inhibits water from entering housing 130 through moisture pump 110. More specifically, protective cap 120 facilitates protecting moisture pump 110 and actuator 140 from incidental water ingress, water spray, surface water, and clogging. Moreover, protective cap 120 prevents housing 130 from ingesting more liquid through moisture pump 110 than can be expelled from housing 130 through moisture pump 110. In an alternative embodiment, protective cap 120 encases housing 130. In such an embodiment, protective cap 120 provides moisture ingress protection due to its relative geometry and orientation to moisture pump 110.

Figure 2:
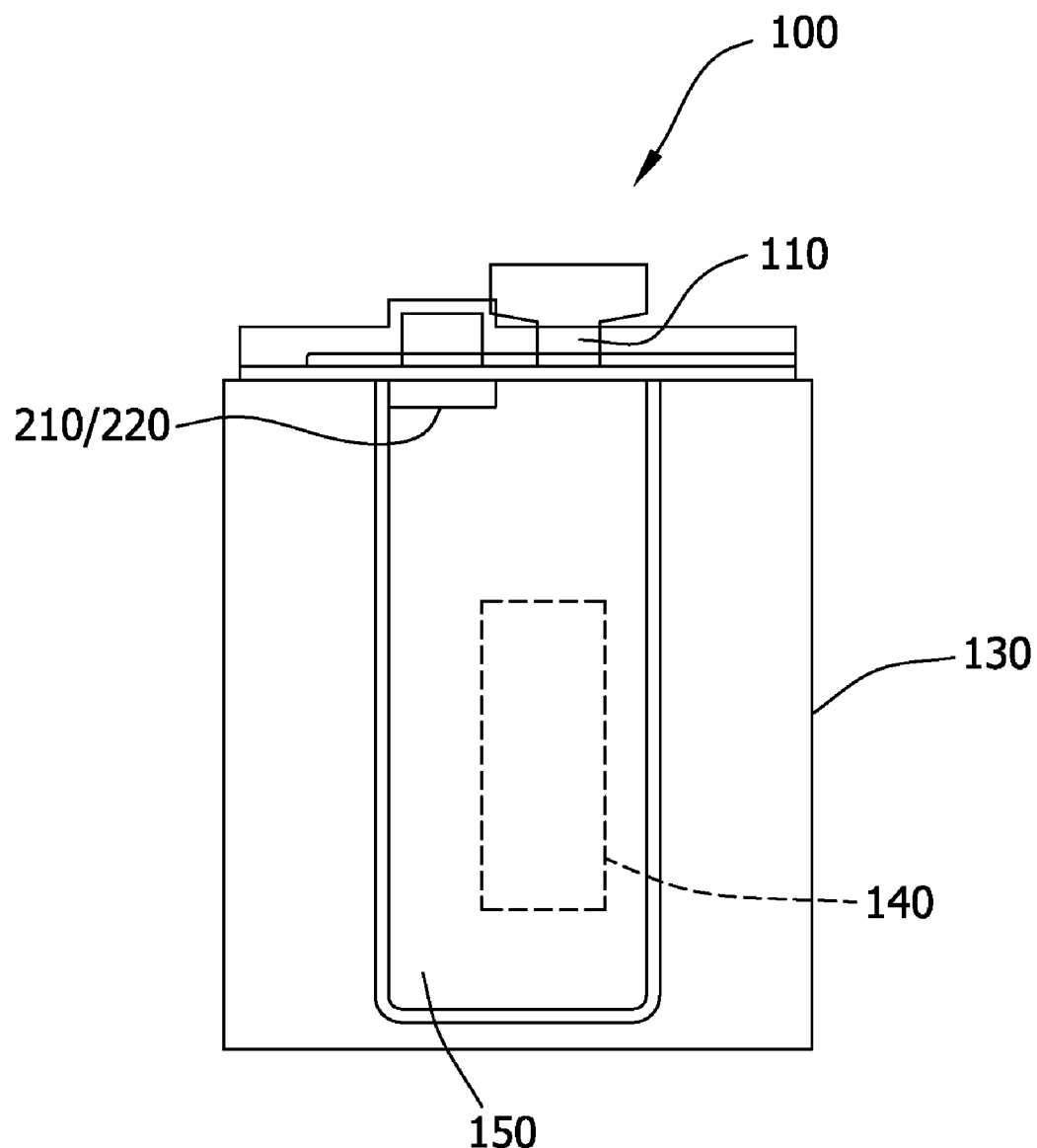
FIG. 2 is a cross-sectional schematic illustration of the electromechanical actuator system shown in FIG. 1.

FIG. 2 is a cross-sectional schematic illustration of EMA 100. In the exemplary embodiment, housing 130 includes a moisture trap 210 and/or a desiccant cartridge 220. Moisture trap 210 is a cavity that is defined between moisture pump 110 and cavity 150. Desiccant cartridge 220 is a material positioned between moisture pump 110 and cavity 150.

In the exemplary embodiment, moisture trap 210 is sized and oriented to trap incidental liquid water ingress in a location remote from actuator 140. More specifically, water seeping through moisture pump 110 is retained in moisture trap 210 and is prevented from contacting actuator 140. Ultimately, any water residing in moisture trap 210 is expelled from housing 130 as air is channeled into and from housing 130 through moisture pump 110.

In the exemplary embodiment, desiccant cartridge 220 is fabricated from a material that enables it to absorb incidental liquid water ingress. More specifically, water seeping through moisture pump 110 is absorbed by desiccant cartridge 220 and is prevented from contacting actuator 140.

Figure 3:
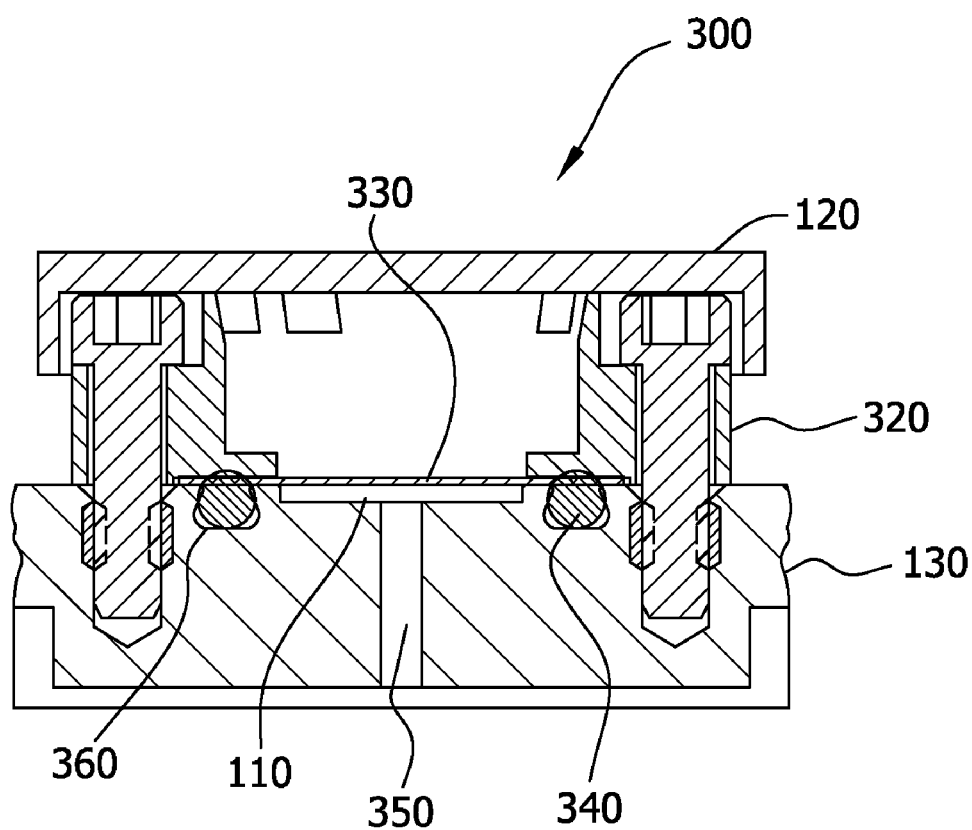
FIG. 3 is a schematic illustration of an exemplary protective cap assembly used with the electromechanical actuator system shown in FIG. 1.
Figure 4:
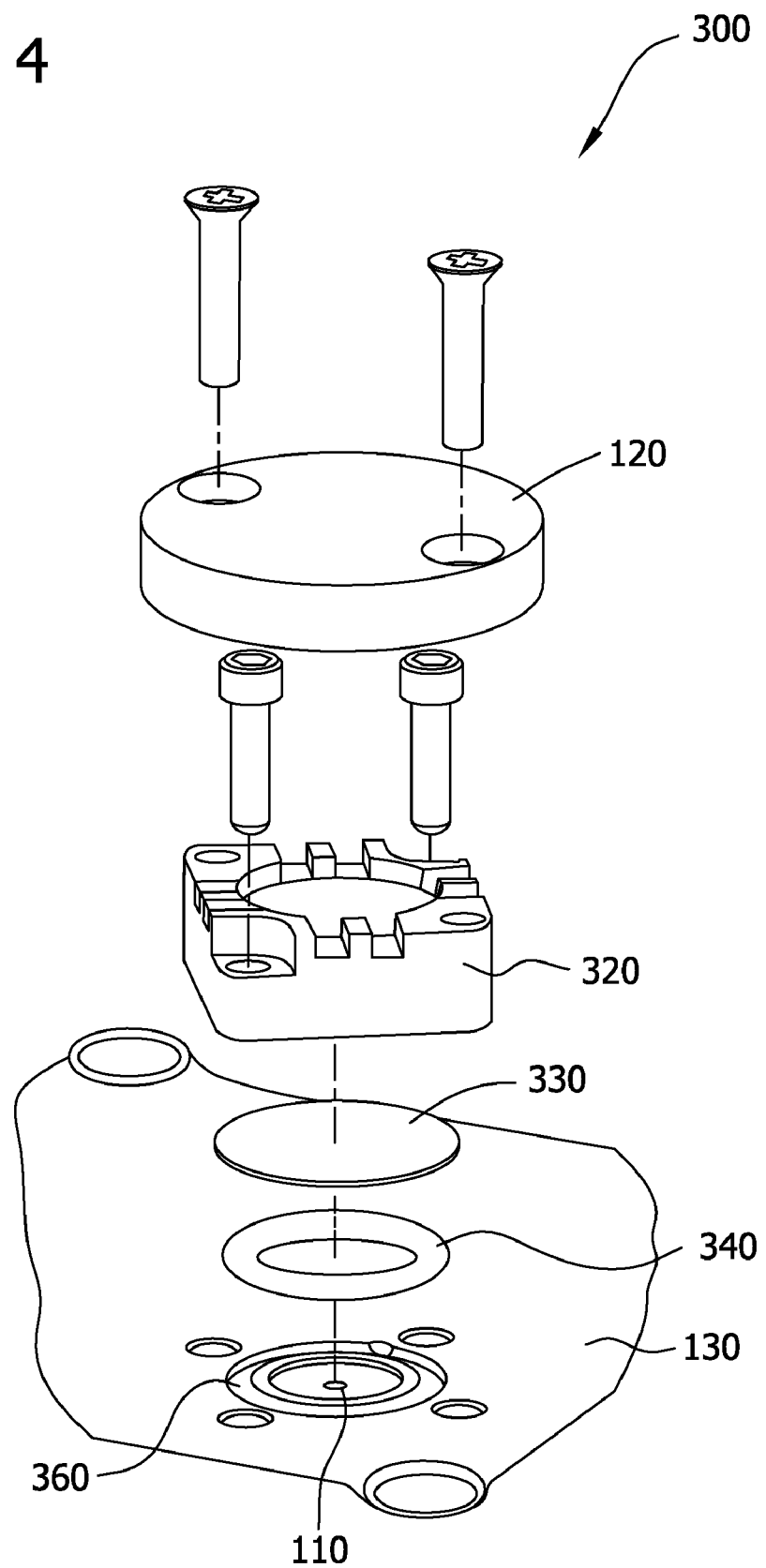
FIG. 4 is a schematic illustration of the protective cap assembly shown in FIG. 3.

FIGS. 3 and 4 are schematic illustrations of an exemplary protective cap assembly 300 that may be used with EMA 100 (shown in FIGS. 1 and 2). In the exemplary embodiment, protective cap assembly 300 includes protective cap 120, a base 320, a porous membrane 330, an elastomer ring 340, and a diffusion inhibition tube 350. Elastomer ring 340 is also known as O-ring and is substantially circular. In alternative embodiments, each feature 120, 320, 330, 340, 350 can operate independently, or in any combination, of the other features.

In the exemplary embodiment, protective cap assembly 300 is coupled to housing 130 such that it substantially covers moisture pump 110. More specifically, housing 130 is coupled to base 320, such that porous membrane 330 is retained against housing 130. Moreover, housing 130 includes a groove 360 that is sized and oriented to position O-ring 340 between housing 130 and base 320. More specifically, O-ring 340 is sized and shaped to fit securely in a mating relationship within groove 360 formed under base 320.

In the exemplary embodiment, porous membrane 330 inhibits water from entering housing 130 through moisture pump 110 while still enabling water to leave housing 130 through moisture pump 110 because of its composition. Porous membrane 330 can be fabricated from any material composition that facilitates this function. Some examples of porous membrane 330 include, but are not limited to, a fabric water barrier such as Teflon (Teflon is a registered trademark of the DuPont Company for products made from fluoropolymers), a sintered metal water barrier, and a sintered ceramic water barrier.

In the exemplary embodiment, O-ring 340 is fabricated from an elastomer and has a substantially circular cross-section shape. Moreover, O-ring 340 facilitates sealing between housing 130 and base 320.

In the exemplary embodiment, diffusion inhibition tube 350 is a narrow tube that connects moisture pump 110 to cavity 150 (not shown in FIGS. 3 and 4). Diffusion inhibition tube 350 slows water vapor ingress during steady state ground conditions. More specifically, diffusion inhibition tube 350 has a length that is sized relative to its diameter such that a length-to-diameter ratio of diffusion inhibition tube 350 facilitates reducing a rate of air exchange between the cavity of housing 130 and the surrounding environment. Thus, diffusion inhibition tube 350 facilitates reducing a rate of humidity exchange within housing 130.

Exemplary embodiments of a breather apparatus on electromechanical actuators for aircraft landing gear systems are described above in detail. The methods and systems are not limited to the specific embodiments described herein, but rather, components of systems and/or steps of the methods may be utilized independently and separately from other components and/or steps described herein. For example, the methods may also be used in combination with other systems and methods, and are not limited to practice with only the systems and methods as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for protecting an electromechanical actuator system from moisture intrusion, said method comprising:
    positioning a housing to encase an electromechanical actuator within a cavity defined by the housing;
    coupling a cap assembly to the housing, the cap assembly including a porous membrane sealed over an opening between the cavity and an exterior of the housing and a cap configured to protect the porous membrane from water spray;
    positioning a desiccant between the opening and the cavity; and
    reducing an intrusion of moisture into the actuator using the desiccant while cycling the electromechanical actuator system through a plurality of pressure and temperature changes due to corresponding changes in altitude of the electromechanical actuator system.

2. A method in accordance with claim 1, wherein coupling a cap to the housing further comprises coupling the cap to the housing to facilitate inhibiting moisture from entering the housing.

3. A method in accordance with claim 1 further comprising coupling a diffusion inhibition tube to the housing to facilitate inhibiting moisture from entering the cavity.

4. A method in accordance with claim 1 further comprising coupling a moisture trap to the housing to facilitate inhibiting fluids entering the housing through the opening from contacting the actuator encased within the housing.

5. A method in accordance with claim 1 further comprising coupling a porous membrane to the cap to facilitate inhibiting fluids from entering the housing through the opening.

6. A method in accordance with claim 1 further comprising coupling a porous membrane to the cap to facilitate removing moisture from the housing.

7. A method in accordance with claim 1 further comprising coupling a porous membrane to the cap wherein the porous membrane is fabricated from at least one of a fabric material, a sintered metal material, and a sintered ceramic material.

8. A method in accordance with claim 1 further comprising coupling a desiccant cartridge to the housing to facilitate increasing an aridity within the cavity.

9. A method in accordance with claim 1, wherein coupling a cap to the housing further comprises coupling the cap to the housing such that the cap at least one of circumscribes the opening and encases the housing.

10. A method in accordance with claim 1, further comprising coupling a base, a porous membrane, and an elastomer ring to the housing.

11. An electromechanical actuator system comprising:
- a housing comprising a cavity defined by said housing and an opening defined in a wall of said housing, said housing encasing an electromechanical actuator within said cavity;
- a cap assembly coupled to said housing, the cap assembly including a porous membrane sealed over the opening between the cavity and an exterior of the housing and a cap configured to protect the porous membrane from water spray; and
- a desiccant positioned between the opening and the cavity, said desiccant configured to reduce an intrusion of moisture into the actuator while the electromechanical actuator system is cycled through a plurality of pressure and temperature changes due to corresponding changes in altitude of the electromechanical actuator system.

12. An actuator system in accordance with claim 11, wherein said cap facilitates inhibiting moisture from entering said housing.

13. An actuator system in accordance with claim 11 further comprising a diffusion inhibition tube that facilitates inhibiting moisture from entering said cavity.

14. An actuator system in accordance with claim 11 further comprising a moisture trap that facilitates inhibiting fluids entering said housing through said opening from contacting the actuator encased within said housing.

15. An actuator system in accordance with claim 11 further comprising a porous membrane that facilitates inhibiting fluids from entering said housing through said opening.

16. An actuator system in accordance with claim 11 further comprising a porous membrane that facilitates removing moisture from said housing.

17. An actuator system in accordance with claim 11 further comprising a porous membrane fabricated from at least one of a fabric material, a sintered metal material, and a sintered ceramic material.

18. An actuator system in accordance with claim 11 wherein the desiccant cartridge facilitates increasing an aridity within said cavity.

19. An actuator system in accordance with claim 11, wherein said cap at least one of circumscribes said opening and encases said housing.

20. An actuator system in accordance with claim 11, wherein said cap comprises a base, a porous membrane, and an elastomer ring.

* * * * *